United States Patent
Bueno Buoro et al.

(10) Patent No.: US 10,656,405 B2
(45) Date of Patent: May 19, 2020

(54) COLOR IMAGE CAPTURE UNDER CONTROLLED ENVIRONMENT FOR MOBILE DEVICES

(71) Applicant: International Business Machines Corporation, Armonk, NY (US)

(72) Inventors: Alvaro Bueno Buoro, Rio de Janeiro (BR); Ademir Fereira da Silva, Sao Paulo (BR); Ricardo Luis Ohta, Sao Paulo (BR)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/876,147

(22) Filed: Jan. 20, 2018

(65) Prior Publication Data
US 2019/0227295 A1    Jul. 25, 2019

(51) Int. Cl.
*G02B 21/36* (2006.01)
*G06T 7/90* (2017.01)
(Continued)

(52) U.S. Cl.
CPC .............. *G02B 21/36* (2013.01); *G02B 21/06* (2013.01); *G02B 21/241* (2013.01); *G06T 7/90* (2017.01);
(Continued)

(58) Field of Classification Search
CPC ...... G02B 21/36; G02B 21/06; G02B 21/241; G06T 7/90; G06T 2207/10024;
(Continued)

(56) References Cited

U.S. PATENT DOCUMENTS 3,634,868 A    1/1972 Pelavin et al.
4,027,971 A *  6/1977 Kolman ............... G01N 15/042
                                                           356/36
(Continued)

FOREIGN PATENT DOCUMENTS

WO    2015077493 A1    5/2015

OTHER PUBLICATIONS

Rauzan, Colorimetric Micro-Paper-Based Analytical Devices: Simple or Complex Diagnostic Assays, Sep. 2014, Literature Seminar; pp. 1-4.*

(Continued)

*Primary Examiner* — Peter D Le
(74) *Attorney, Agent, or Firm* — Joseph Petrokaitis; Otterstedt, Wallace & Kammer, LLP (57) ABSTRACT

A method for image capture for colorimetric analysis includes inserting a colorimetric sample into a slot formed in a base of a device. The device includes a lid surrounding and covering the base. The lid includes a central opening, and a plurality of lights are within the lid and surrounding the opening. The method also includes selecting one or more wavelengths and intensities for illuminating the sample within the device, illuminating the sample within the device with the selected one or more wavelengths and intensities by selectively activating one or more of the plurality of lights, adjusting a height of a camera over the sample to focus the sample in the camera, and capturing at least one image of the sample using the camera.

19 Claims, 6 Drawing Sheets

(51) Int. Cl.
G02B 21/06 (2006.01)
G02B 21/24 (2006.01)
(52) U.S. Cl.
CPC .... *G02B 21/24* (2013.01); *G06T 2207/10024* (2013.01); *G06T 2207/10048* (2013.01); *G06T 2207/10056* (2013.01); *G06T 2207/10064* (2013.01); *G06T 2207/10152* (2013.01)
(58) Field of Classification Search
CPC . G06T 2207/10048; G06T 2207/10056; G06T 2207/10064; G06T 2207/10152
See application file for complete search history.

(56) References Cited

U.S. PATENT DOCUMENTS

| | | | | |
|---|---|---|---|---|
| 4,854,160 | A | * | 8/1989 | Glatt .................. G01K 11/165 73/73 |
| 5,481,380 | A | | 1/1996 | Bestmann |
| 5,713,661 | A | * | 2/1998 | White ................ G01N 21/8806 359/629 |
| 5,724,145 | A | * | 3/1998 | Kondo ............... G01B 11/0625 250/559.28 |
| 5,850,472 | A | | 12/1998 | Alston et al. |
| 6,545,260 | B1 | * | 4/2003 | Katashiro ................ G01B 9/00 250/227.26 |
| 8,979,741 | B2 | | 3/2015 | Igarashi et al. |
| 9,506,855 | B2 | | 11/2016 | Papautsky et al. |
| 9,658,152 | B2 | | 5/2017 | Zimmerle et al. |
| 2003/0067956 | A1 | * | 4/2003 | Hashimoto ........... G01J 5/0044 374/121 |
| 2004/0061779 | A1 | * | 4/2004 | Harless .............. G01N 21/9501 348/125 |
| 2004/0223215 | A1 | * | 11/2004 | Weiss ..................... G02B 21/16 359/386 |
| 2005/0024719 | A1 | * | 2/2005 | Nakata ............... G02B 6/02333 359/368 |
| 2008/0068018 | A1 | * | 3/2008 | Massin ................ G01R 33/302 324/321 |
| 2010/0246614 | A1 | * | 9/2010 | Koshi .................. H01S 5/0683 372/20 |
| 2011/0261355 | A1 | | 10/2011 | Hannel et al. |
| 2012/0035080 | A1 | * | 2/2012 | Unger ................... G02B 21/36 506/12 |
| 2012/0235756 | A1 | * | 9/2012 | Nishida ................. G04F 5/145 331/94.1 |
| 2013/0308852 | A1 | | 11/2013 | Hamsici et al. |
| 2014/0242612 | A1 | * | 8/2014 | Wang ................... G01N 21/253 435/7.23 |
| 2015/0172522 | A1 | * | 6/2015 | O'Neill ................ H04N 5/2252 348/240.3 |
| 2015/0355527 | A1 | * | 12/2015 | Takahashi ............. G03B 15/05 348/371 |
| 2015/0359458 | A1 | | 12/2015 | Erickson et al. |
| 2015/0362828 | A1 | * | 12/2015 | Patel ..................... G03B 17/48 348/75 |
| 2018/0092534 | A1 | * | 4/2018 | Nabhan .................. A61B 3/14 |

OTHER PUBLICATIONS

H. Karlsen et al., "Illumination and Device Independence for Colorimetric Detection of Urinary Biomarkers with Smartphone," 38th Annual International Conference of the IEEE Engineering in Medicine and Biology Society (EMBC), Aug. 2016, p. 5184-5187.
A. Mutlu et al., "Smartphone Based Colorimetric Detection via Machine Learning," Analyst, May 21, 2017, v. 142, n. 13, p. 2434-2441.
W. Chen et al., "A Simple Paper-Based Colorimetric Device for Rapid Mercury(II) Assay," Scientific Reports, Aug. 24, 2016, v. 6, n. 31948, p. 1-7, https://www.nature.com/articles/srep31948.
L. Shen et al., "Point-of-care colorimetric detection with a smartphone," Lab on a Chip, Sep. 21, 2012, v. 12, n. 21, p. 4240-4243.
D. Breslauer et al., "Mobile Phone Based Clinical Microscopy for Global Health Applications." PLoS ONE, Jul. 2009, v. 4, n. 7, e6320, p. 1-7.
D. Tseng et al., "Lensfree microscopy on a cellphone." Lab on a Chip, Jul. 21, 2010, v. 10, n. 14, p. 1787-1792.
G. Luka et al., "Portable device for the detection of colorimetric assays." Royal Society Open Science, Nov. 1, 2017, v. 4, n. 171025, p. 1-13.
A. Venkatesh et al., "Smartphone-based colorimetric readers for cost-effective in vitro diagnostics," Oct. 2015, MikroSystemTechnik (MST) Kongress, p. 452-454.
N. Thom et al., "Quantitative Fluorescence Assays Using a Self-Powered Paper-Based Microfluidic Device and a Camera-Equipped Cellular Phone" RSC Advances, Jan. 1, 2014, v. 4, n. 3, p. 1334-1340.
S. Kim et al., "A Smartphone-Based Automatic Measurement Method for Colorimetric pH Detection Using a Color Adaptation Algorithm." Sensors, Jul. 10, 2017, v. 17, n. 7, E1604, p. 1-13.
V. Onescu et al., "Smartphone based health accessory for colorimetric detection of biomarkers in sweat and saliva," Lab on a Chip, Aug. 21, 2013, v. 13, n. 16, p. 3232-3236.
A. Yetisen et al., "A smartphone algorithm with inter-phone repeatability for the analysis of colorimetric tests," Sensors and Actuators B, Jun. 2014, v. 196, p. 156-160.
Martinez et al., "Simple Telemedicine for Developing Regions: Camera Phones and Paper-Based Micofluidic Devices for Real-Time, Off-Site Diagnosis," Analytical Chemistry, v. 80, n. 10, May 2008, p. 3699-3707.
Webster's Unabridged Dictionary of the English Language, 2002, p. 1800.
Webster's Encyclopedic Unabridged Dictionary, 1996, p. 1342.
Webster's Universal College Dictionary, 1997, p. 739.
Braham, Random House Webster's Dictionary, 1996, p. 623.
The Merriam-Webster Dictionary, 1997, p. 686.
Webster's New American Dictionary, 1995, p. 488.
Websters II New Riverside Dictionary, Revised Edition, 1996, p. 638.
Merriam-Webster's Collegiate Dictionary, Tenth Edition, 1994, p. 1106.
Neufeldt, Webster's New World Dictionary of American English, Third College Edition, 1988, p. 1263.
Soffer & Kahrl, Thesaurus of Patent Claim Construction, Second Edition, 2013, vol. 1, § 7335.
Garrod, Glossary of Judicial Claim Constructions in the Mechanical, Electro-Mechanical and Medical Devices Arts, version 1.4a, Oct. 2010, p. 328 & n. 3684, http://www.pubpat.org/assets/files/garrodglossaries/GarrodMechElectroMechMedDevGlossaryv1.4a.pdf.

\* cited by examiner

COLOR IMAGE CAPTURE UNDER CONTROLLED ENVIRONMENT FOR MOBILE DEVICES

BACKGROUND

The present invention relates to the electrical, electronic and computer arts, and, more particularly, to improvements in colorimetric or fluorescence analysis.

Various methods of chemical analysis use color paper bands (e.g., micro paper analytic device—µPAD, lateral flow, etc.) with reagents for comparison with reference colors to obtain a qualitative interpretation (e.g., whether or not a target substance is present) and/or a quantitative interpretation (e.g., a concentration value of the target substance). Quantitative color analysis in particular often requires a color judgement by the user that is dependent on her visual accuracy and other factors, such as the light environment at the moment of the analysis and visual fatigue.

Currently, systems are available to execute colorimetric analysis using smartphone cameras. However, the current available solutions suffer from one or more deficiencies: The form factor of a conventional solution is typically suitable only for a very specific model of smartphone (e.g., Apple iPhone 5s), which vastly limits the number of people that can use the solution and demands customization for every different mobile device. A conventional solution often does not take into account environmental variables, which might influence the chemical reaction dynamics and, thus, the color obtained. A conventional solution typically uses ambient environment light or a flashlight as a illumination source, and hence is restricted to the visible spectrum, and also cannot be adjusted by the user.

SUMMARY

In one aspect of the invention, a method for colorimetric or fluorescence analysis includes inserting a sample into a slot formed in a base of a device. The device includes a lid surrounding and covering the base. The lid includes a central opening, and a plurality of light sources that are within the lid and surrounding the opening. The method also includes selecting one or more wavelengths and intensities for illuminating the sample within the device, illuminating the sample within the device with the selected one or more wavelengths and intensities by selectively activating one or more of the plurality of light sources, adjusting camera height over the sample to obtain optimum focus of the sample in the camera image, and capturing at least one image of the sample using the camera.

Another aspect of the invention includes a device for colorimetric or fluorescence analysis. The device includes a base having a slot formed therein sized for insertion of a sample. The device also includes a lid surrounding and covering the base, the lid comprising a central opening. The device further includes a plurality of lights sources surrounding the central opening within the lid, a control for selecting one or more wavelengths and intensities, and a microcontroller for selectively activating one or more of the plurality of lights based at least in part on the selected one or more wavelengths and intensities.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

These and other features and advantages of the present invention will become apparent from the following detailed description of illustrative embodiments thereof, which is to be read in connection with the accompanying drawings.

DETAILED DESCRIPTION

Figure 1A:
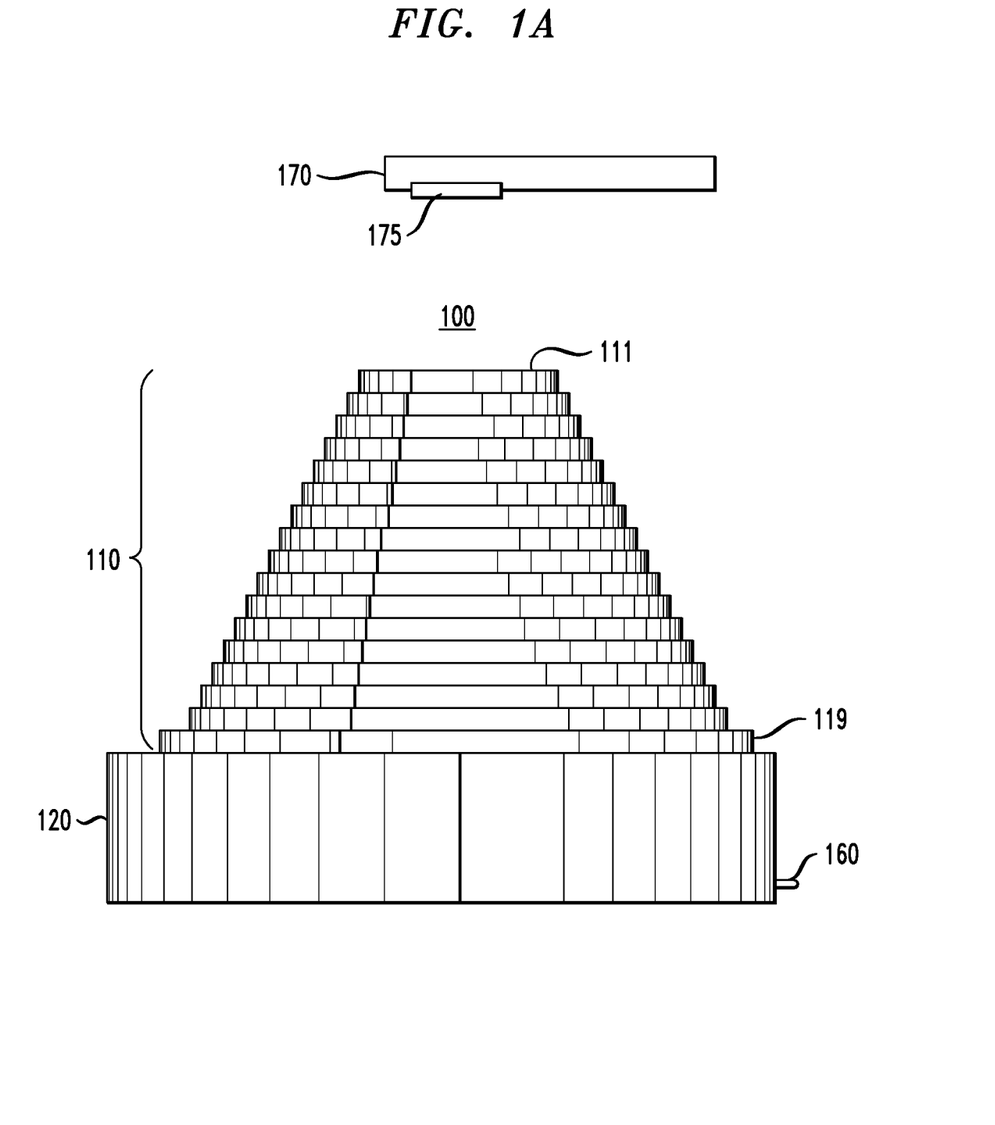
FIG. 1A is a side view of a device according to an illustrative embodiment of the invention.
Figure 1B:
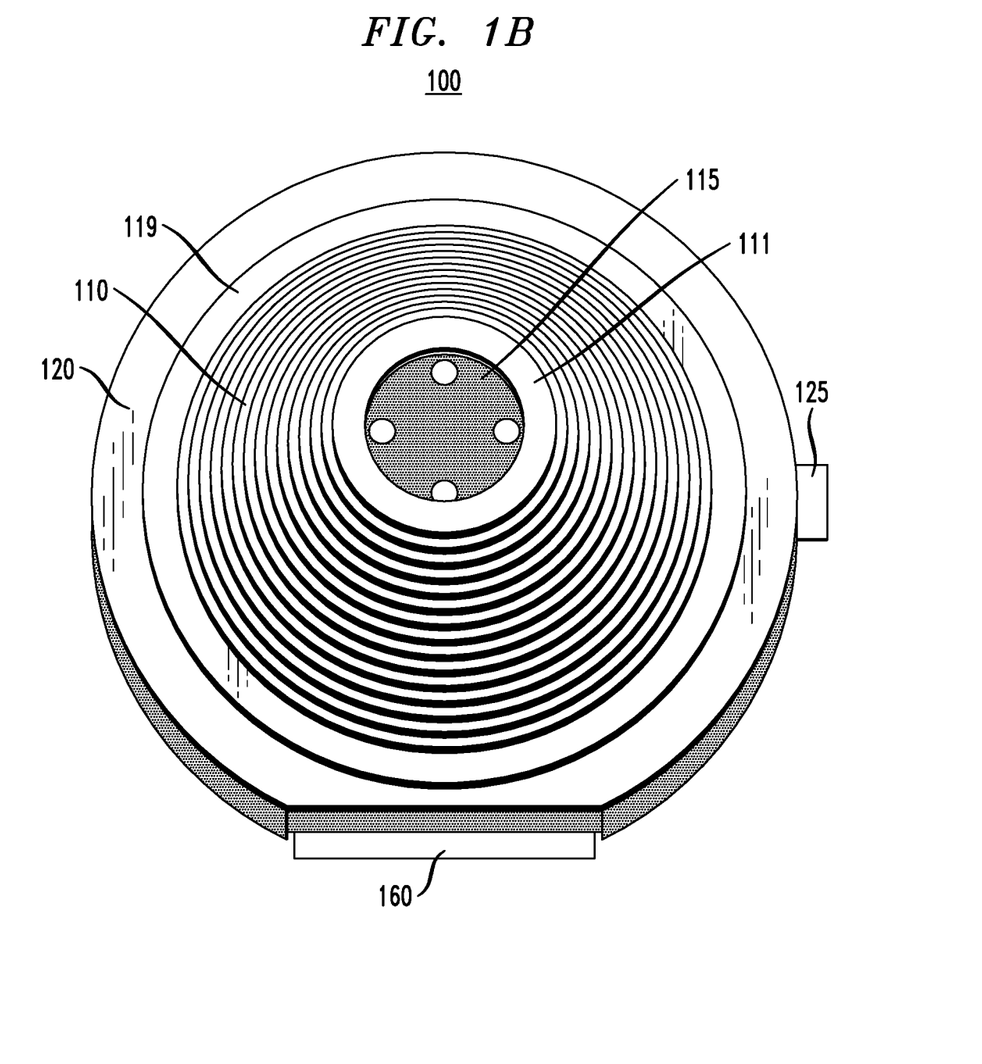
FIG. 1B is a top view of a device according to an illustrative embodiment of the invention.
Figure 1C:
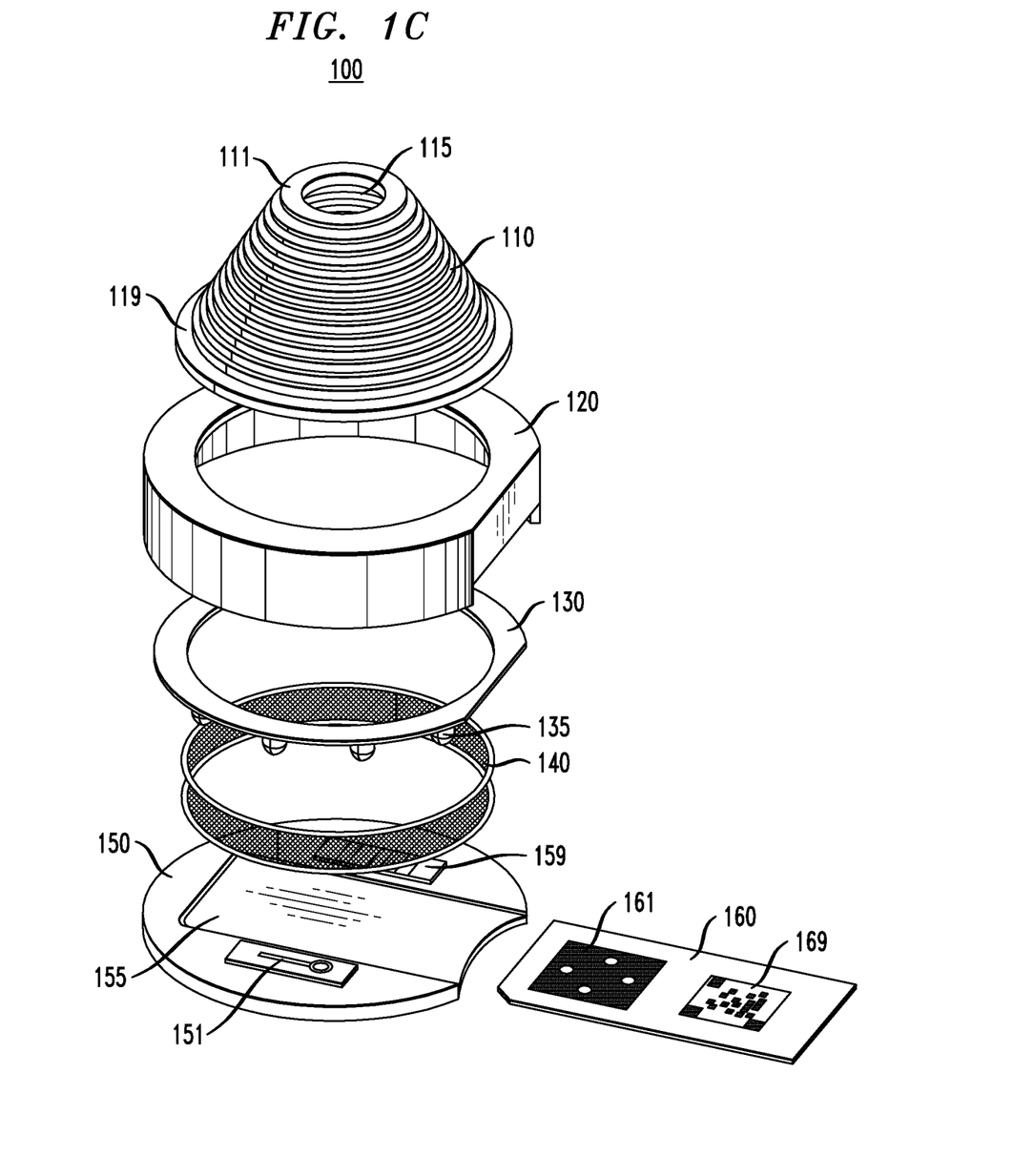
FIG. 1C is an exploded view of a device according to an illustrative embodiment of the invention.
Figure 1D:
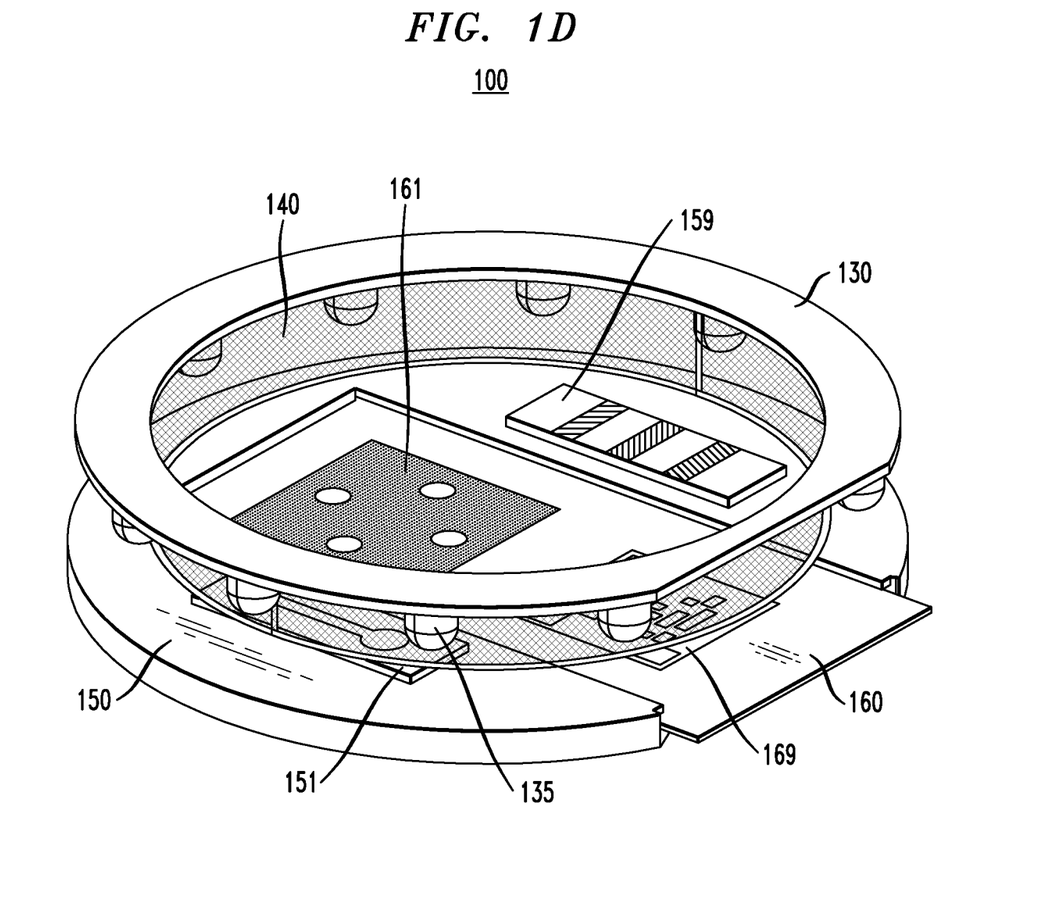
FIG. 1D is a view of a device according to an illustrative embodiment of the invention, with certain components removed for greater visibility of other components.

FIG. 1A is a side view of a device 100 according to an illustrative embodiment of the invention. FIG. 1B is a top view of a device 100 according to an illustrative embodiment of the invention. FIG. 1C is an exploded view of a device 100 according to an illustrative embodiment of the invention. FIG. 1D is a view of a device 100 according to an illustrative embodiment of the invention, with certain exterior components removed for greater visibility of interior components.

As shown in FIGS. 1A, 1B and 1C, the uppermost component of device 100 is adjustable cover 110. Adjustable cover 110 may comprise a plurality of concentric rings (e.g., top ring 111 through bottom ring 119, with increasing diameters) which may be pliable and flexible, such that the rings can fold and unfold in an accordion-like fashion, thereby allowing for adjustment of the height of adjustable cover 110. Thus, adjustable cover 110 may decreased in size to facilitate easier storage of device 100 and provide flexibility in usage of different smartphone camera models, with different focus distance. Adjustable cover 110 preferably has a center opening 115 formed therein, which begins at top ring 111 and continues through each ring, including bottom ring 119. In one embodiment, the diameter of center opening 115 increases in proportion to the increasing diameter of the rings between top ring 111 and bottom ring 119, such that the difference between an outer radius of each ring and an inner radius of each ring remains substantially constant.

In an illustrative embodiment, top ring 111 may have an outer diameter of about 30 millimeters (mm), and an inner diameter of about 20 millimeters (mm), such that the diameter of center opening 115 within top ring 111 is about 20 millimeters (mm). Thus, the difference between an outer radius of top ring 111 and an inner radius of top ring 111 is about 5 millimeters (mm). Bottom ring 119 may have an outer diameter of about 80 millimeters (mm), and may have an inner diameter of about 70 millimeters (mm), such that the diameter of center opening 115 within bottom ring 119 is about 70 millimeters (mm). As previously noted, the height of adjustable cover 110 (e.g., between a top of top ring 111 and a bottom of bottom ring 119) is adjustable, but in some embodiments may be about 40 millimeters.

As shown in FIGS. 1A, 1B and 1C, adjustable cover 110 may be disposed above rigid cover 120. Rigid cover 120 may comprise a ring with a top which is partially closed, but still has an opening formed therein, as shown in FIG. 1C. The top of rigid cover 120 preferably has an interior diameter no greater than the exterior diameter of bottom ring 119, and the top of rigid cover 120 preferably has an exterior diameter which is greater than the exterior diameter of bottom ring 119. For example, rigid cover 120 may have an exterior diameter of about 94 millimeters (mm). Rigid cover 120 may have a height of about 20 millimeters (mm), while device 100 may have a total height of about 60 millimeters (mm).

The exterior of rigid cover 120 may not be perfectly round, but rather may have one or more flat sections. For example, as shown in FIGS. 1B and 1C, the exterior of rigid cover 120 may have a flat section corresponding to an opening formed within base 150 for insertion of sample 160. As another example, as shown in FIG. 1B, the exterior of rigid cover 120 may have a flat section corresponding to one or more knobs/dials/buttons 125 or other control mechanism, further discussed below with reference to FIG. 3.

As shown in FIGS. 1C and 1D, components 130, 140, and 150 may be formed within rigid cover 120, such that these components are not visible in FIGS. 1A and 1B. Thus, FIG. 1C shows an exploded view of device 100, while FIG. 1D shows a view of device 100 with adjustable cover 110 and rigid cover 120 removed, so that components 130, 140, and 150 may be seen.

The bottom of rigid cover 120 is attached to a top or exterior surface of base 150. Thus, base 150 should have a diameter approximately equal to that of rigid cover 120. Where a bottom of rigid cover 120 is attached to a top surface of base 150, base 150 may have a diameter slightly greater than rigid cover 120. Where a bottom of rigid cover 120 is attached to an exterior surface of base 150, base 150 may have a diameter slightly less than rigid cover 120. Thus, base 150 may have an diameter of about 94 millimeters (mm).

Base 150 may have one or more environmental color strip tests thereon to provide relevant environmental information that may impact the colorimetric reaction for analysis, such as thermometer strip 151 (e.g., for Arrhenius' equation) and/or humidity strip 159 (e.g., due to hygroscopy of cellulose fibers and/or salts). Base 150 also has a groove 155 formed therein to facilitate placement of sample 160 therein. Groove 155 preferably includes an external opening formed in a side of base 150 to permit insertion of sample 160 into the device 100. Groove 155 may have a length of approximately 82 millimeters (mm) and a width of approximately 40 millimeters (mm).

Sample 160 may comprise, for example, a paper-based colorimetric/fluorescence analysis device, such as a micro paper analytic device (µPAD). Sample 160 preferably has dimensions corresponding to those of groove 155, and thus sample 160 may have a length of approximately 82 millimeters (mm) and a width of approximately 40 millimeters (mm). Sample 160 may include one or more chemical analysis points 161 in addition to sample identification structure 169 (e.g., ID text and/or barcode).

LED circle 130 may be mounted on, or at least within, the top of rigid cover 120. Thus, LED circle 130 may have an outer diameter less than the outer diameter of the rigid cover 120, and LED circle 130 have an inner diameter greater than the inner diameter of the rigid cover 120. Moreover, the exterior of LED circle 130 may not be perfectly round, but rather may have one or more flat sections, corresponding to one or more flat sections of the exterior of rigid cover 120. LED circle 130 has a plurality of LED lights, e.g., 135, formed on the bottom surface thereof.

Light diffuser 140 is located between LED circle 130 and base 150, and preferably light diffuser 140 has a height greater than a height of LED lights 135, such that diffuser 140 prevents LED lights 135 from contacting base 150. Light diffuser 140 may have a height less than a height of rigid cover 120, as well as a diameter greater than an interior diameter of the top of rigid cover 120. Light diffuser 140 may have a diameter less than an outer diameter of the rigid cover 120. Light diffuser 140 may have a diameter less than an outer diameter of LED circle 130, and may have a diameter such that the light diffuser is disposed inside of the LED lights 135. Light diffuser 140 may have a diameter greater than an inner diameter of LED circle 130, such that LED circle 130 rests at least in part on light diffuser 140 and/or light diffuser 140 is mounted to LED circle 130. Light diffuser 140 may have a diameter less than an inner diameter of LED circle 130, such that rigid cover 120 rests at least in part on light diffuser 140 and/or light diffuser 140 is mounted to the partially closed top of rigid cover 120. Light diffuser 140 may be formed of a transparent and/or translucent material so as to provide homogeneous light output of LED lights 135. Light diffuser 140 may include a color filter to provide for fluorescence analysis.

FIG. 1A also shows a mobile device (smartphone or tablet) 170 disposed above device 100. A camera 175 of mobile device 170 may be aligned at least part with opening 115 in top ring 111 of adjustable cover 110. As further discussed below with reference to FIG. 4, a height of smartphone 170 relative to base 150 may be adjusted in order to help focus the image captured by camera 175, which may include adjusting a height of adjustable cover 110 relative to rigid cover 120, thereby providing a focal distance compensation mechanism. An exemplary embodiment of device 100 may therefore be hardware agnostic and adaptable to any smartphone/tablet 170. Sample 160 and smartphone/tablet 170 are not components of device 100, but rather are components which may be used with device 100. Device 100 may be powered by integrated rechargeable batteries, or smartphone/tablet 170 may be used as a power source for device 100.

Figure 2:
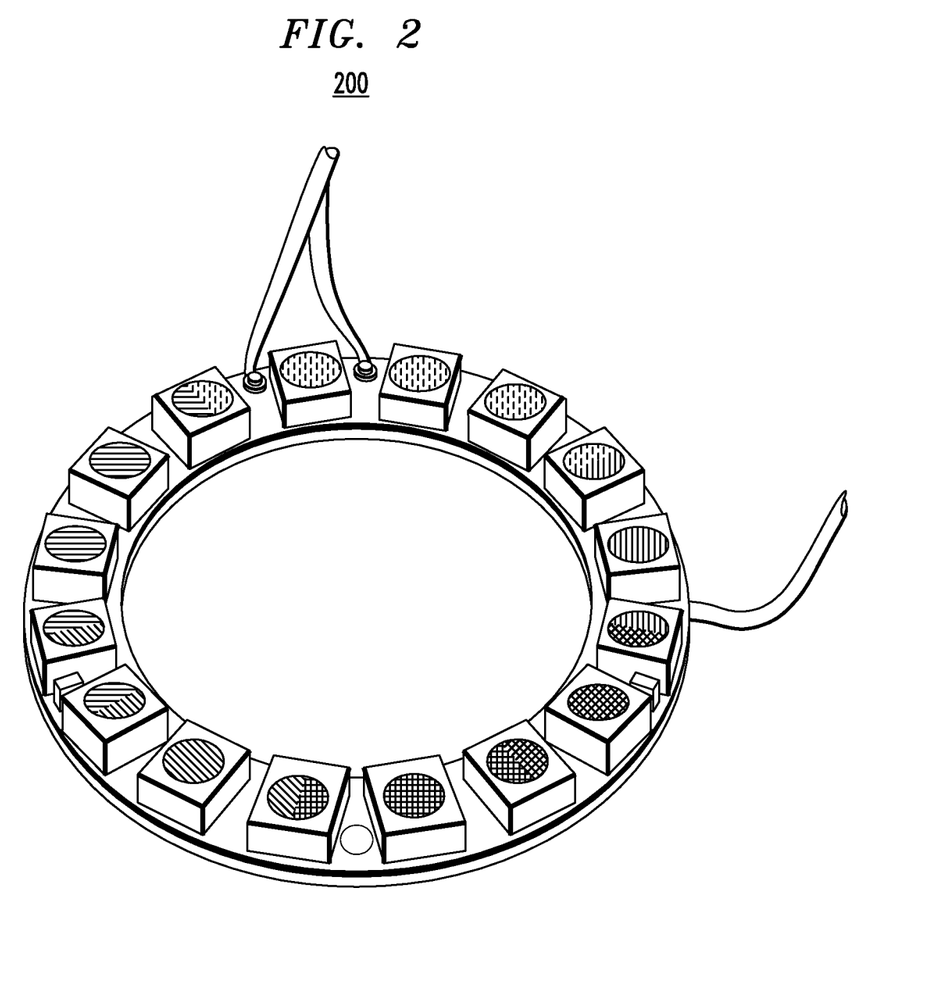
FIG. 2 is an exemplary Red-Green-Blue Light-Emitting Diode (RGB LED) circle suitable for use with an illustrative embodiment of the invention.

FIG. 2 is an exemplary RGB LED circle suitable for use with an illustrative embodiment of the invention. LED circle 200 in FIG. 2 may correspond, for example, to LED circle 130 in FIG. 1. LED circle 200 shown in FIG. 2 comprises a plurality of LEDs (e.g., 135 in FIG. 1) which emit light in different colors, or more generally, energy with different wavelengths. Thus, light of a specific wavelength may be emitted by selectively activating one or more of the plurality of LEDs on LED circle 200. In some embodiments, sequential (e.g., time division) analysis can also be applied, in which one or more LED lights are selectively illuminated to emit energy with a first wavelength, and then one or more other LED lights are selectively illuminated to emit energy with a second wavelength. In some embodiments, multiple analyses can be executed in parallel, assuming the analysis spectrums do not interfere, by simultaneously emitting energy both at a first wavelength and at a second wavelength. This process can be applied for each chemical analysis point 161, further increasing system functionality and versatility.

Although LED circle 200 includes LEDs of different colors, embodiments may instead use white LEDs to provide a broad spectrum illumination. Moreover, LED circle 200 may include LEDs which emit electromagnetic energy outside of the visible spectrum, such as infrared (IR) and/or ultraviolent (UV) energy, thus allowing for a combination of colorimetric and/or fluorescence analysis in visible and non-visible spectrum.

For example, there are colorimetric/fluorescence reactions where ultraviolet light is more appropriate for analysis than white and/or visible light. For example, an embodiment may enable colorimetric detection in the invisible spectrum, such as UV light, with the resulting irradiation lying in the visible wavelength range (e.g., green). There are also situations where a specific light spectrum, such as red, can intensify and/or enhance the quantitative detection of the colorimetric phenomenon occurring in the sample 160.

The colorimetric reaction that occurs in the sample (e.g., 160) varies according to the types of chemical reagent(s) and/or element(s) under analysis. Thus, the choice of wavelength (e.g., color) may be dependent on the reagents and/or elements which provide a given color variation, in the presence of the target substance. The wavelength to be chosen may be obtained from laboratory experiments, which indicate the most advantageous and/or efficient wavelength region to execute the colorimetric/fluorescence analysis for a specific type of μPAD.

Figure 3:
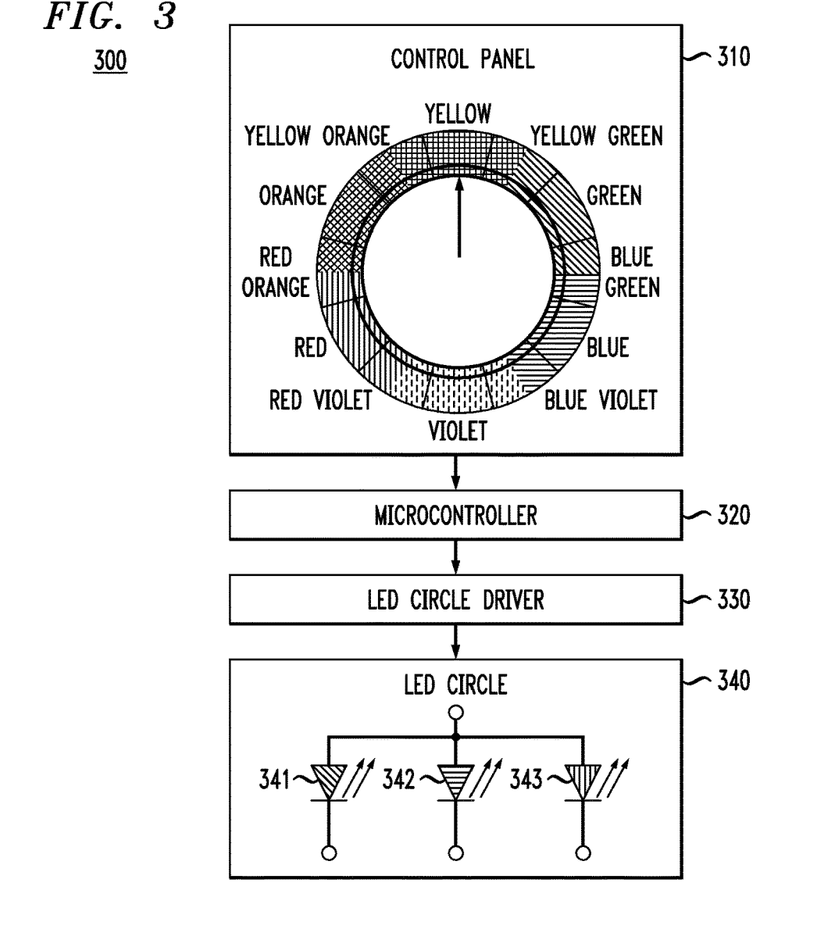
FIG. 3 is a combined block/flow diagram depicting aspects of an illustrative embodiment of the invention.

FIG. 3 is a combined block/flow diagram depicting aspects of an illustrative embodiment of the invention. Specifically, FIG. 3 shows an illumination control system 300 according to an illustrative embodiment of the invention. Control panel 310 may comprise one or more manual controls (analog and/or digital) which allow a user to select an appropriate wavelength and/or intensity for analyzing sample 160. Control panel 310 may comprise, for example, one or more knobs, dials, buttons and/or control elements, such as those shown in FIG. 3 and discussed above with reference to element 125 in FIG. 1B. Control panel 310 may additionally or alternatively include a button which allows a user to access a preset analysis profile for sample 160, e.g., for a specific type of μPAD.

Microcontroller 320 receives signal input from control panel 310 and modifies a pulse-width modulated (PWM) signal input of LED color driver 330 for a color chosen by the user, e.g., yellow. Microcontroller 320 and/or LED color driver 330 may use one or more standard algorithms for RGB (red, green, blue) illumination. One or more LEDs (341, 342, 343) of LED circle 340 may be independently activated by LED color driver 330 at the appropriate intensity to emit the desired color.

Figure 4:
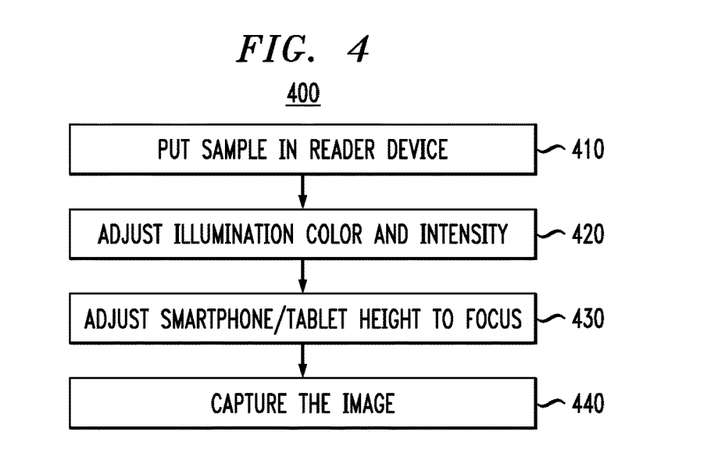
FIG. 4 is a flow chart depicting a method according to an illustrative embodiment of the invention.

FIG. 4 is a flow chart depicting a method 400 according to an illustrative embodiment of the invention. In step 410, a sample 160 (e.g., μPAD) is inserted into a reader device 100, and more particularly into groove 155 within base 150. In step 420, the illumination color and intensity may be adjusted by the user, as discussed above with reference to element 125 in FIG. 1B and element 310 in FIG. 3.

In step 430, a height of smartphone/tablet 170 relative to base 150 may be adjusted in order to help focus the image captured by camera 175, which may include adjusting a height of adjustable cover 110 relative to rigid cover 120, thereby providing a focal distance compensation mechanism. In step 440, at least one image is captured by camera 175 using the illumination color and intensity selected by the user in step 420.

Thus, an illustrative embodiment may remove environmental and human analysis variation factors by providing repeatable light conditions in different wavelengths for colorimetric/fluorescence analysis, while permitting consideration of environmental variables, such as temperature and humidity. An illustrative embodiment may allow smartphone/tablet 170 to take pictures of μPADs 160 in a controlled light environment, with standardized and repetitive conditions, without the influence of environmental lighting conditions. An illustrative embodiment may provide repeatable homogeneous illumination, both in terms of intensity and spatial distribution. Moreover, an illustrative embodiment may provide conditions for smartphone/tablet 170 to capture photographs in a wider color range and/or spectrum.

An illustrative embodiment may also include a color reference strip, e.g., on base 150 in a manner similar to temperature strip 151 and humidity strip 159, which may be used to have a known reference and to calculate a compensation factor due to camera sensor variation, which can then be applied in the colorimetric analysis made over the unknown sample. An example of a normalization factor is:

$$Ref_{calib} = (R_{calib}, G_{calib}, B_{calib})$$

Where $R_{calib}$ is the pixel value on Red channel of reference, under a camera sensor used to obtain calibration, $G_{calib}$ is the pixel value on Green channel, under a camera sensor used to obtain calibration, and $B_{calib}$ is the pixel value on Blue channel, under a camera sensor used to obtain calibration. Thus, to generate a normalization factor, we can use the following formula:

$$\text{Normalized factor} = \frac{Ref_{calib}}{Ref_{analysis}}$$

Where $Ref_{analysis}$ is the reference color values, under analysis camera sensor. Additionally, a color reference calibration can be used to stabilize smartphone 170 camera 175 functions, such as auto exposure and color saturation.

Given the availability of smartphones and tablets, an illustrative embodiment of the invention may provide an easy and precise chemical analysis result without needing to send samples to laboratories. Illustrative embodiments of the invention may be used in areas such as, e.g., healthcare, food/beverage quality control, environmental applications for agriculture, soil analysis, water, etc. Device 100 and smartphone 170 may provide a quick first screening in any condition without requiring a high level of expertise or laboratory equipment. In healthcare, for example, this can be extremely useful for early field detection of outbreaks by providing healthcare professionals with a quick, quantitative, and reliable tool.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for colorimetric or fluorescence analysis, the method comprising:
    inserting a sample into a slot formed in a base of a device, the sample comprising at least one chemical analysis point, the device further comprising a lid surrounding and covering the base, the lid comprising a central opening without a corresponding opening through the base, wherein a plurality of lights are within the lid and surrounding the central opening;
    selecting one or more wavelengths and intensities for illuminating the sample within the device;
    illuminating the sample within the device with the selected one or more wavelengths and intensities by selectively activating one or more of the plurality of lights;
    adjusting a height of a camera over the sample to focus the sample in the camera; and
    capturing at least one image of the sample using the camera;
    wherein the one or more wavelengths and intensities for illuminating the sample are selected based at least in part on a humidity of an environment in which the device is being used.

2. The method of claim 1, wherein the sample comprises a micro paper analytic device (µPAD).

3. The method of claim 1, wherein the one or more wavelengths and intensities for illuminating the sample are selected based at least in part on one or more chemical characteristics of the sample.

4. The method of claim 1, wherein the one or more wavelengths and intensities for illuminating the sample are selected based at least in part on one or more characteristics of an environment in which the device is being used.

5. The method of claim 4, wherein the base further comprises at least one color strip measuring at least one of the one or more characteristics of the environment in which the device is being used.

6. The method of claim 4, wherein the one or more characteristics of the environment comprise at least one of a temperature and a humidity of the environment.

7. The method of claim 1, wherein each of the plurality of lights emits energy having a different wavelength.

8. The method of claim 1, wherein the one or more wavelengths comprises at least one of infrared energy and ultraviolet energy.

9. The method of claim 1, wherein:
    selecting one or more wavelengths and intensities for illuminating the sample within the device comprises selecting a plurality of wavelengths and intensities for illuminating the sample within the device; and
    illuminating the sample within the device comprises illuminating the sample within the device with the selected plurality of wavelengths and intensities at least in part by:
        illuminating the sample within the device with at least a first one of the selected plurality of wavelengths and intensities by selectively illuminating at least a first one or more of the plurality of lights; and
        illuminating the sample within the device with at least a second one of the selected plurality of wavelengths and intensities by selectively illuminating at least a second one or more of the plurality of lights.

10. The method of claim 9, wherein the sample is sequentially illuminated with the selected plurality of wavelengths and intensities.

11. The method of claim 9, wherein the sample is simultaneously illuminated with the selected plurality of wavelengths and intensities.

12. The method of claim 9, wherein the sample comprises a plurality of chemical analysis points, and wherein selecting the plurality of wavelengths and intensities for illuminating the sample within the device comprises selecting wavelengths and intensities corresponding to respective ones of the plurality of chemical analysis points.

13. The method of claim 1, wherein:
    the device further comprises a cover having a bottom disposed on the lid;
    a distance between the bottom of the cover and a top of the cover is adjustable;
    the top and bottom of the cover each have a central opening aligned with the central opening of the lid; and
    adjusting the height of the camera over the sample comprises:
        adjusting the distance between the bottom of the cover and the top of the cover; and
        positioning the camera over the central opening in the top of the cover.

14. The method of claim 13, wherein the distance between the bottom of the cover and the top of the cover is adjusted based at least in part on a focal length of the camera.

15. A device for colorimetric or fluorescence analysis, the device comprising:
    a base, the base having a slot formed therein sized for insertion of a sample, the sample comprising at least one chemical analysis point;
    a lid surrounding and covering the base, the lid comprising a central opening without a corresponding opening through the base;
    a plurality of lights surrounding the central opening within the lid;
    a control for selecting one or more wavelengths and intensities; and
    a microcontroller for selectively activating one or more of the plurality of lights based at least in part on the selected one or more wavelengths and intensities;
    wherein the one or more wavelengths and intensities for illuminating the sample are selected based at least in part on a humidity of an environment in which the device is being used.

16. The device of claim 15, wherein the base further comprises at least one color strip measuring at least one of a temperature and a humidity of an environment in which the device is being used.

17. The device of claim 15, wherein the plurality of lights comprises a light-emitting diode (LED) circle.

18. The device of claim 15, wherein:
- the device further comprises a cover having a bottom disposed on the lid;
- a distance between the bottom of the cover and a top of the cover is adjustable; and
- the top and bottom of the cover each have a central opening aligned with the central opening of the lid.

19. The device of claim 15, wherein dimensions of the slot are substantially similar to dimensions of the sample.

* * * * *